United States Patent
Otsuka

(10) Patent No.: US 7,610,464 B2
(45) Date of Patent: Oct. 27, 2009

(54) METHODS AND APPARATUS FOR PROVIDING INDEPENDENT LOGICAL ADDRESS SPACE AND ACCESS MANAGEMENT

(75) Inventor: Katsushi Otsuka, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 297 days.

(21) Appl. No.: 11/550,096

(22) Filed: Oct. 17, 2006

(65) Prior Publication Data
US 2007/0208885 A1 Sep. 6, 2007

Related U.S. Application Data

(60) Provisional application No. 60/775,829, filed on Feb. 22, 2006.

(51) Int. Cl.
*G06F 12/14* (2006.01)
(52) U.S. Cl. .................................. 711/163; 711/202
(58) Field of Classification Search ........................ None
See application file for complete search history.

(56) References Cited

U.S. PATENT DOCUMENTS

| 7,149,854 B2 * | 12/2006 | Weber et al. ................. 711/152 |
| 2003/0018860 A1 | 1/2003 | Krueger |
| 2006/0004983 A1 * | 1/2006 | Tsao et al. ................... 711/202 |

OTHER PUBLICATIONS

International Preliminary Report on Patentability for corresponding International Application PCT/JP2007/000111.
International Search Report and Written Opinion of PCT/JP2007/000111.

* cited by examiner

*Primary Examiner*—Than Nguyen
(74) *Attorney, Agent, or Firm*—Matthew B. Dernier, Esq.; Gibson & Dernier LLP

(57) ABSTRACT

A command receiver receives, from an external access requesting entity, a command with which to access data, together with an address to be accessed and IOID to identify the access requesting entity. Based on the IOID, the access decision unit determines whether or not an access is one that is to be permitted for an access requesting entity to access a region of access destination. The access decision unit determines whether access of the access requesting entity is permitted or not, for each page that serves as the basic management unit of logical address in the processor space.

22 Claims, 11 Drawing Sheets

METHODS AND APPARATUS FOR PROVIDING INDEPENDENT LOGICAL ADDRESS SPACE AND ACCESS MANAGEMENT

CROSS REFERENCE TO RELATED APPLICATIONS

This application claims the benefit of U.S. Provisional Patent Application No. 60/775,829, filed Feb. 22, 2006, entitled "Memory Access Controlling Apparatus And Command Transmit Supporting Apparatus," the entire disclosure of which is hereby incorporated by reference.

BACKGROUND OF THE INVENTION

1. Field of the Invention

The present invention relates to technologies by which to control the I/O access, and it particularly relates to a technology by which to control the access requests from external devices.

2. Description of the Related Art

Along with recent years' significant advance of the computer graphics technology and image processing techniques, which are utilized in the fields of computer games, digital broadcasting and the like, there is demand that the information processing apparatus such as computers, gaming machines and televisions be equipped with faster processing capacity to process high-definition image data. To meet such demand, it goes without saying that the arithmetic processing itself needs to be done at high speed. By the same token, it is important to suitably distribute the tasks among a plurality of processing units.

Each processing unit accesses memory as appropriate when tasks are to be executed. In so doing, if the access by a processing unit B to a memory area secured for the processing of a processing unit A is granted, the performance stability will be impaired. Particularly in the case of an I/O device for controlling the peripheral equipment, there are many cases where a DMA requester directly designates a physical address so as to control the memory. The malfunction of such an I/O device or a device driver that controls the I/O device may impose a serious effect on the performance stability of an information processing apparatus.

SUMMARY OF THE INVENTION

One embodiment of the present invention relates to an I/O access control apparatus. This apparatus comprises: a command receiver which receives, from an external access requesting entity, a command for controlling data in a memory space of a processor, together with address information used to specify an address to be accessed and ID information used to identify the access requesting entity; an access decision unit which determines whether access of the access requesting entity to an address specified by the address information is permitted or not, by referring to an access permission/denial determination table that associates an address in the memory space with ID information on an access requesting entity which is to be permitted to access a region specified by the address; and an access processing unit which executes access of the access requesting entity to the memory space, on the condition that the access has been permitted by said access decision unit. This apparatus may be so formed as to be built into a processor, and the access requesting entity may be a device provided outside the processor.

According to this embodiment, it can be determined whether or not the access is a valid one permitted to access an address region to which the access request has been made, based on the ID information. The "ID information" may be generated exclusively as a bit sequence defined by a predetermined format, for example. It serves the purpose as long as it is the information with which an access requesting identity can be uniquely identified.

The address information may be information indicative of a logical address which is a virtual address obtained after a memory address has been converted in a predetermined format. In such a case, this apparatus may further comprise: an address translation table memory which stores an address translation table to translate a logical address into a physical address; and an address translation unit which translates the logical address specified by the address information into a physical address by referring to the address translation table.

According to this embodiment, based on the ID information, different logical addresses can be independently assigned to the respective access requesting entities. Since a physical address is not specified directly from an access requesting entity, the memory space can be protected more safely against external accesses. Since the logical addresses are used, the data transfer between an external access requesting entity and a processor can be executed based on abstracted addresses that do not rely on a system.

This apparatus may load a partial translation table which is a part corresponding to a predetermined logical address range in the address translation table, into a cache memory from the address translation table memory, prior to address translation by said address translation unit. When data necessary for translating a logical address specified by the address information into a physical address is contained in the loaded partial translation table, the address may be converted by referring to the partial translation table; and when not contained, a new partial translation table may be loaded into the cache memory from the address translation table memory.

When the necessary data is not contained in the partial translation table loaded prior to execution of the address translation, a new partial translation table may be loaded into the cache memory in a state where the partial translation table is being held in the cache memory.

This apparatus may further comprise an access attribute table memory which stores an access attribute table that associates an address in the memory space with access attribute information defining an access condition for a region specified by said address, wherein the access processing unit may execute an access specified by the received command in accordance with the access condition specified by the access attribute table, on the condition that access of the access requesting entity is permitted by the access decision unit.

Another embodiment of the present invention relates to a command transmit auxiliary apparatus. This apparatus comprises: an ID adding unit which assigns ID information to identify a predetermined access requesting entity, to a command for controlling data, in a memory space of a processor, sent from the access requesting entity together with address information used to specify an address to be accessed in the memory space of a processor; and a command transmitter which transmits the command to which the ID information has been assigned, to an external device that determines whether access of the access requesting entity to the address specified by the address information is to be permitted or not, by referring to an access permission/denial determination table that associates an access in the memory space and ID information on an access requesting entity in which access is to be permitted to a region specified by said address of the memory space.

The ID information may be assigned to each access requesting entity, by software that controls the each access requesting entity and an external device in a unified manner and using a strict rule. Such software may be an OS or application software operated based on the OS.

It is to be noted that those expressing the present invention in the form of a method, an apparatus, a system, a recording medium, and a computer program are also effective as and encompassed by the present embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
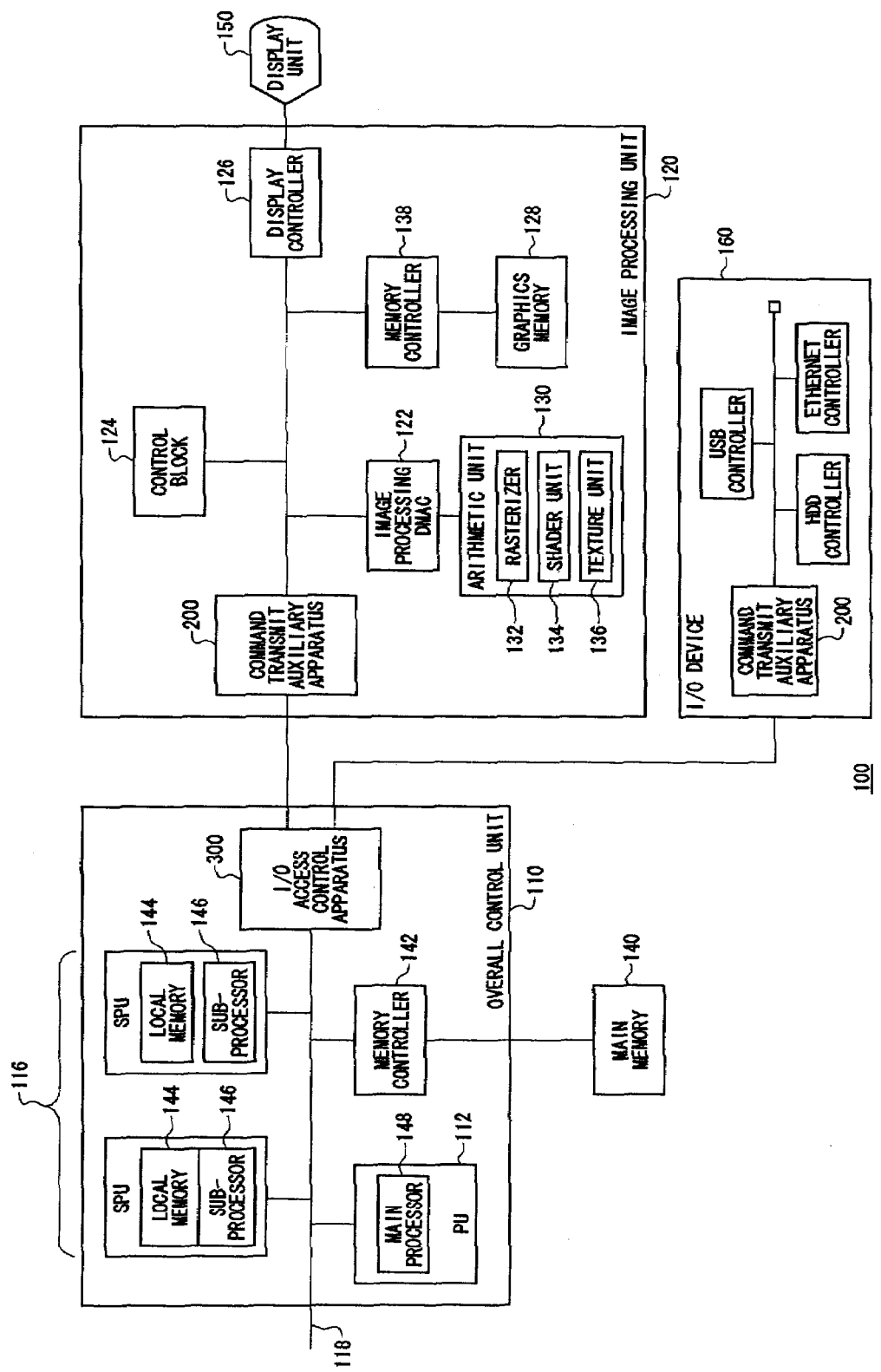
FIG. 1 is a functional block diagram of an information processing apparatus according to an embodiment of the present invention.

FIG. 1 is a functional block diagram of an information processing apparatus 100. The information processing apparatus 100 includes an overall control unit 110, an image processing unit 120, a main memory 140 and an I/O device 160. The information processing apparatus 100 is connected with a display unit 150. The display unit 150 outputs images and videos obtained as a result of processings performed by the overall control unit 110 and the image processing unit 120. The I/O device 160 is a device serving as an I/O interface or the like with other data processing devices such as Southbridge. In the I/O device, a universal serial bus (USB) controller, a hard disk derive (HDD) controller, an Ethernet controller and the like are connected to a command transmit auxiliary apparatus 200 described later. As for the I/O device 160 connected with the information processing apparatus 100, there may be provided a plurality of or a plurality of types of I/O devices 160. The overall control unit 110 and the image processing unit 120 are each formed as a single-chip electronic device and are physically separated from each other. Note that the overall control unit 110 combined with the image processing unit 120 may also be formed as a single-chip electronic device.

In terms of hardware, each element described, as a functional block for carrying out a wide variety of processing operations, as shown in FIG. 1 and the like, can be configured by a CPU (Central Processing Unit), a memory and other LSI (Large Scale Integration). In terms of software, it is realized by memory-loaded programs or the like that have a function of reserved management. Thus, it is understood by those skilled in the art that these functional blocks can be realized in a variety of forms such as by hardware only, software only or the combination thereof and are not limited to any of these in particular.

In the information processing apparatus 100, an operating system (hereinafter referred to as "OS") is executed that provides functions and environments to use the information processing apparatus 100 efficiently and controls the entire apparatus in a unified manner and controls it under a strict rule Multiple applications are run on OS. The OS in the information processing apparatus 100 according to the present embodiment is of three hierarchies having a user layer, a kernel layer and hypervisor layer from the top. Hereinafter, software that manages the hypervisor layer will be called "privilege software". The user layer, the kernel layer and the hypervisor layer function as the "OS" of the information processing apparatus 100 and are formed in an integrated structure.

The overall control unit 110 includes a processing unit (PU) 112 and a plurality of synergistic-processing units (SPUs) 116, a memory controller 142 and an I/O access control apparatus 300. The PU 112, the SPUs 116, the memory controller 142 and the I/O access control apparatus 300 can communicate with one another via a bus 118. The main memory 140 is connected with the memory controller. The information processing apparatus 100 can be connected with another information processing apparatus 100 via the bus 118.

The PU 112 allocates tasks, a task serving as a basic unit of processing in each application, to each SPU 116. Alternatively, the PU 112 itself may execute tasks. The PU 112 includes a main processor 148 as an arithmetic entity. Each SUP 112 executes a task assigned so as to execute a plurality of tasks in parallel. The SPU 116 includes a sub-processor 146 as an arithmetic subject and a local memory 144 as a local storage area. The OS is executed by PU 112.

Accordingly, a memory space under management of the PU 112 in the overall control unit 110 is formed by the main memory 140 and a plurality of local memories 144. Hereinafter, such a "memory space under management of the PU 112" will be simply referred to as "management space". Though the detail will be described later, a DMA requester that exists external to the overall control unit 110 and functions as a device requesting a DMA transfer, such as a USB controller 160, an image processing DMAC (Direct Memory Access Controller) 122 or a display controller 126, can access a management space by way of the I/O access control apparatus 300. That is, the USB controller 160 and the image processing DMAC 122 execute read/write of data to the management space via a command transmit auxiliary apparatus 200 and the I/O access control apparatus 300. Hereinafter, the devices that access the management space from the outside of the overall control unit 110 will be collectively called "access requesting subject" or "access requesting entity".

Processing executed by the PU 112 is called "main process" and processing executed by the SPU 116 is called "sub-process". The PU 112 executes processing operations for overall control of the information processing apparatus 100, such as user-interface-related processing which has a relatively high priority. In contrast to this, the SPU 116 executes processing operations subcontracted from the main process, such as calculations executed in the background which has a relatively low priority.

A DMAC, not shown in FIG. 1, included in the SPU 116 controls data transfer, data save and the like between a built-in graphics memory 128 in the image processing unit 120 and the main memory 140 connected via the memory controller, by a command from the PU 112 or the SPU 116.

The I/O access control apparatus 300 places all of access requesting commands from an access requesting entity, under its total control. Here, the access requesting command is a command requesting a write of data to a management space of the PU 112 or a command requesting a readout of data in the management space, as described earlier. The access requesting command will be described in detail with reference to FIG. 2. The management space of the PU 112 is mapped to the main memory connected with the main controller 140 and the local memory 144 in each SPU 116. Other storage areas, for example, a storage area of another information processing apparatus 100 may be mapped to this management space. When the access requesting entity accesses the management space of the PU 112, an access requesting command is sent to the I/O access control apparatus 300. The I/O access control apparatus 300 receives the access requesting command and then control read/write from/to the management space.

The main memory 140 is a storage area mapped to part of the management space. Data on the execution status of tasks are stored in the main memory 140. For instance, stored temporarily is the coordinate data obtained after the coordinate computation related to the computer graphics has been executed by the overall control unit 110. There are cases where the data generated by the image processing unit 120 are saved in this main memory 140. The local memory 144 is also a storage area mapped to part of the management space, and it principally stores working data necessary for executing the sub-processes.

The image processing unit 120 is a unit that exclusively carries out image processing, for instance, rendering processing. The image processing unit 120 executes image processing, following the instructions from the overall control unit 110. The image processing unit 120 carries out image processing related to the respective tasks processed by the overall control unit 110 and outputs the generated images or videos to the display apparatus 150. The image processing unit 120 may time-share and execute a plurality of image processing operations in parallel.

The image processing unit 120 includes a memory controller 138, a graphics memory 128, an image processing DMAC 122, an arithmetic unit 130, a display controller 126, a control block 124, and a command transmit auxiliary apparatus 200. These units are connected with one another via the bus 118 and thus these units can communicate with one another. The graphics memory 128 is connected with the bus 118 by way of the memory controller 138. The arithmetic unit 130 is connected with the bus 118 by way of the image processing DMAC 122.

The graphics memory 128 is a memory area for storing graphics data that are used and managed by the image processing unit 120. Provided in the graphics memory 128 are not only a frame buffer and a Z-buffer, where image frame data are stored, but also areas corresponding to data, such as vertex data, texture data and color lookup table, which are the basic data referred to at the rendering of image frame data.

The control block 124 is a block for controlling the image processing unit 120 as a whole. The control block 124 performs an overall control of the arithmetic unit 130, the graphics memory 128 and the display controller 126 and carries out synchronization management, timer management and the like of data transfer between the respective blocks.

The image-processing-side DMAC 122 controls the data transfer, data save and the like between the overall control unit 110 or the main memory 140 and the graphics memory 128, following a command from the control block 124.

The display controller 126 generates horizontal and vertical synchronization signals and loads, sequentially in a line, the pixel data of image frame data from a frame buffer stored in the graphics memory 128 according to the display timing of the display apparatus 150. Furthermore, the display controller 126 makes an output by converting the pixel data having been loaded in a line, from the digital data comprised of RGB (Red-Green-Blue) color values, into a format corresponding to the display apparatus 150.

The arithmetic unit 130 carries out a variety of arithmetic processing operations concerning graphics, following the commands from the control block 124. One example of such processing may be a series of rendering processes for generating image frame data through coordinate transformation, hidden-surface elimination and shading based on three-dimensional modeling data and writing them into a frame buffer.

The arithmetic unit 130 includes such functional blocks as a rasterizer 132, a shader unit 134 and a texture unit 136 in order to effect a high-speed processing of three-dimensional graphics in particular.

The rasterizer 132 receives vertex data of a basic object to be rendered (hereinafter referred to as "primitive") from the overall control unit 110 and performs a view transformation of converting the primitive on a three-dimensional space into graphics on a rendering plane through a projection transformation. Furthermore, it carries out a raster processing of scanning the graphics on the rendering plane along the horizontal direction of the rendering plane and converting them column by column into quantized pixels. The primitive is pixel-expanded by the rasterizer 132, and the pixel information is calculated for each pixel. The pixel information includes RGB color values, a values indicating transparency, and Z values indicating depth from viewpoints.

The rasterizer 132 generates a pixel area of a predetermined size along the scan lines and outputs it to the shader unit 134 and the texture unit 136. The pixel areas outputted from the rasterizer 132 are once stacked into a queue, and the shader unit 134 processes the stacked pixel areas one by one.

The shader unit 134 carries out a shading processing based on the pixel information calculated by the rasterizer 132, determines the pixel colors after a texture mapping based on the texel information obtained by the texture unit 136, and writes the image frame data after the shading processing in a frame buffer in the graphics memory 128. Furthermore, the shader unit 134 performs processing operations, such as fogging and alpha blending, on the image frame data written into the frame buffer, determines final rendering colors, and updates the image frame data in the frame buffer.

The texture unit 136 receives parameters specifying texture data from the shader unit 134, reads out the requested texture data from a texture buffer in the graphics memory 128, and outputs them to the shader unit 134 after performing a predetermined processing thereon.

Upon receipt of basic information necessary for image generation, such as the vertex data of a primitive, or a start instruction for image generation from the overall control unit 110, the image processing unit 120 executes image processing independently of the overall control unit 110. The image processing DMAC 122 transfers the data generated by the image processing unit 120 to the graphics memory 128 and the management space.

When the access requesting entity transfers the demand data in the image processing unit 120 to the management space, the command transmit auxiliary apparatus 200 contained in the image processing unit 120 transmits an access requesting command to the I/O access control apparatus 300 in the overall control unit 110, from the image processing unit 120. The command transmit auxiliary apparatus 200 transmits a logical address of the management space to be accessed, ID information to identify the access requesting entity (this ID information being hereinafter referred to as "IOID (Input/Output device ID)", and an access requesting command which has been turned into a packet. In the case of a write instruction, data to be written are also transmitted following the access requesting command. The I/O access control apparatus 300 controls the access to the management space from the access requesting entity according to the access requesting command received.

The command transmit auxiliary apparatus 200 is mounted not only on the image processing unit 120 but also on the I/O device 160. The command transmit auxiliary apparatus 200 mounted on the I/O device 160 also transmits an access requesting command to the overall control unit 110 from the I/O device 160. One that serves as an access request entity in the image processing unit 120 is the image processing DMAC 122 or display controller 126. One that serves as the access requesting entity in the I/O device 160 is the aforementioned USB controller, HDD controller, Ethernet controller or the like. When various types of access requesting entities request the access to the management space, the command transmit auxiliary apparatus 200 generates an access requesting command having a predetermined format and then transmits it to the overall control unit 110. The I/O access control apparatus 300 is a device that receives access requests from various types of access requesting entities via various command transmit auxiliary apparatuses 200 and then controls the accesses to the management space.

A detailed description will be given of the command transmit auxiliary apparatuses 200 in FIG. 2 and onward, especially with reference to FIG. 5.

Figure 2:
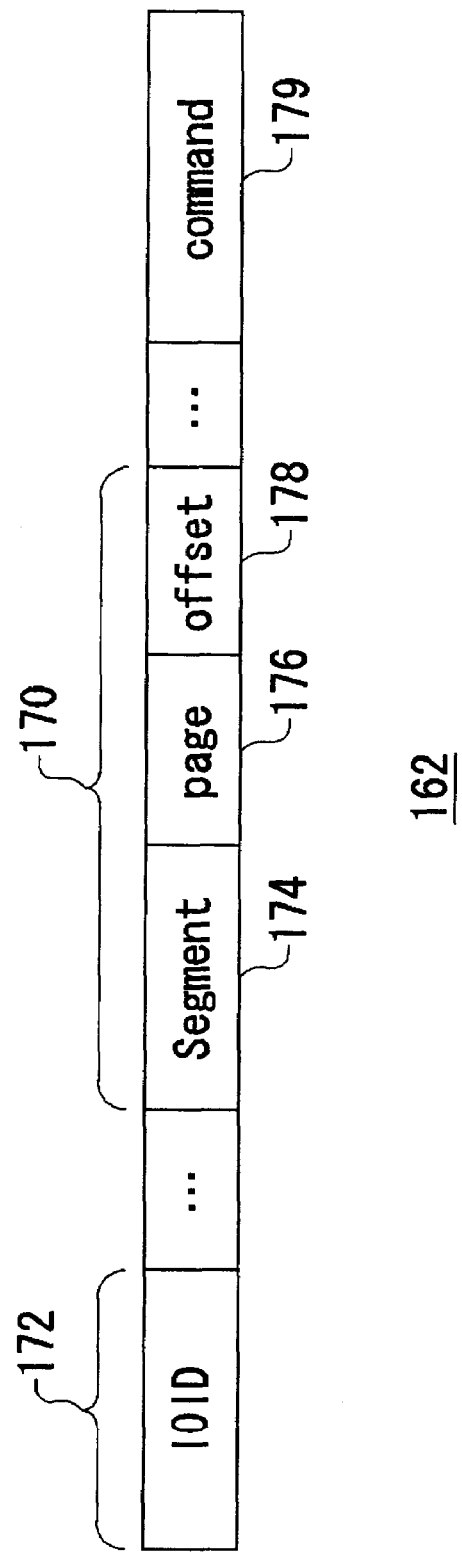
FIG. 2 illustrates a data structure of an access requesting command.

FIG. 2 illustrates a data structure of the access requesting command 162. The access requesting command 162 as shown in FIG. 2 is sent out to the I/O access control apparatus 300 from the command transmit auxiliary apparatus 200. An IOID region 172 represents an IOID that the command transmit auxiliary apparatus 200 assigns to uniquely identify an access requesting entity. The IOID is an ID by which to uniquely identify each access requesting entity in the information processing apparatus 100. A command region 179 indicates command contents such as read or write. An address region 170 indicates an address of an access destination in a management space. This address is a logical address but not the address that directly specifies a physical address. A logical address space is partitioned into segments and a segment is partitioned into pages. The specific address in each page is designated by an offset. The address region 170 contains a segment region 174, a page region 176 and an offset region 178. The segment region 174 indicates a segment value that designates a segment, the page region 176 indicates a page value that designates a page, and the offset region 178 indicates an offset region 178 that designates an offset value within the page.

Of the access requesting commands 162, the address region will be discussed later in conjunction with FIG. 6 and FIG. 7.

Figure 3:
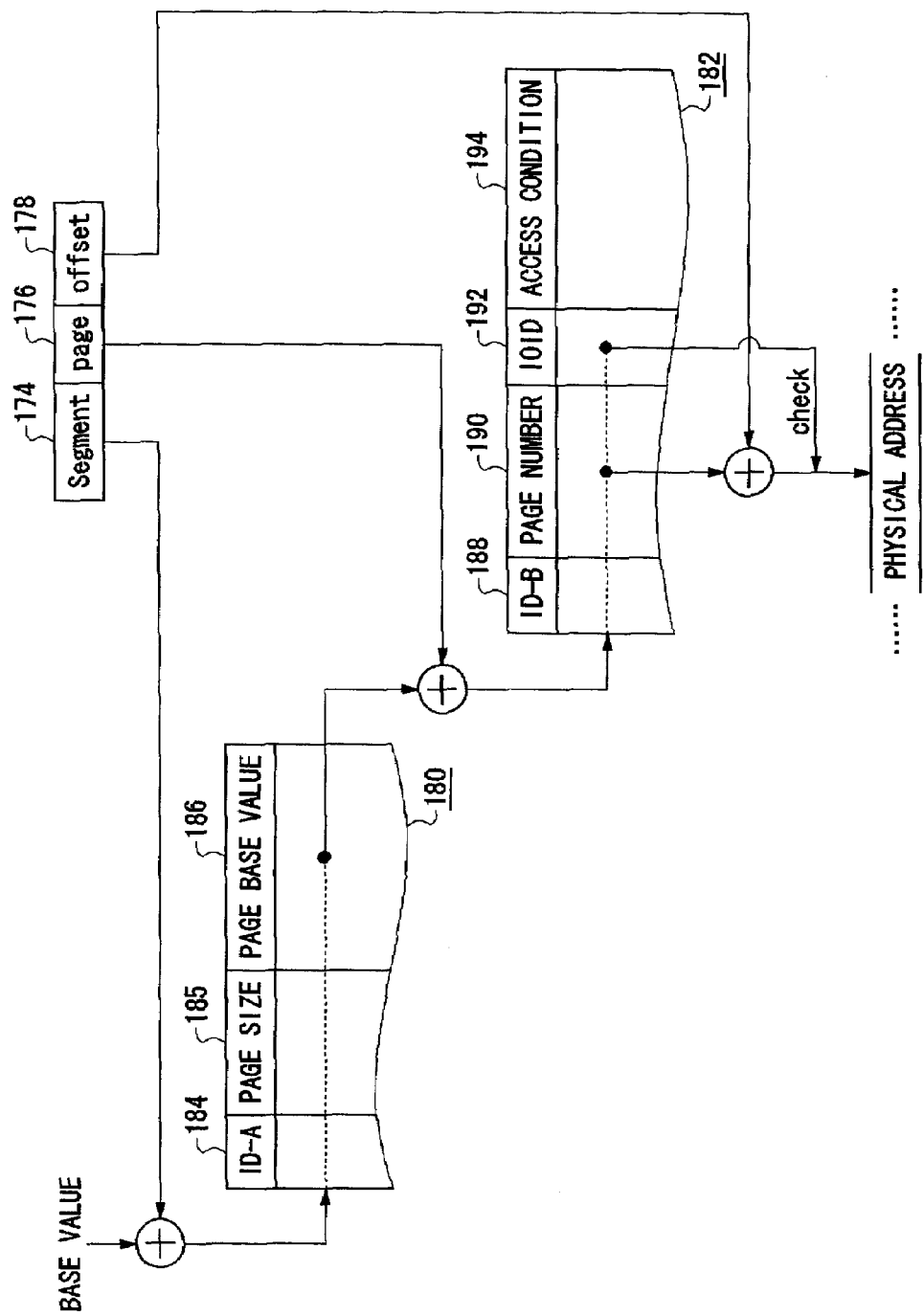
FIG. 3 is a schematic diagram to explain a process in which a logical address indicated by an access requesting command is translated into a physical address.

FIG. 3 is a schematic diagram to explain a process in which a logical address indicated by an access requesting command is translated into a physical address.

Such a conversion processing is carried out by the I/O access control apparatus 300. The I/O access control apparatus 300 extracts the address region 170 of an access requesting command 162. Firstly, the segment value is extracted. A predetermined base value is added to the segment value. The base value may be allocated by an OS or may be a fixed value. The base value added with the segment value is a first index value. A first translation table 180 is a data table in which the first index value is associated with a page base value. The page base value is specified by the first translation table 180.

In the first translation table 180, a first index column 184 indicates first index values. A page base column 185 indicates page sizes. A page base value column 186 indicates page base values. A page value in the page region 176 is added with a page base value specified by the first translation table 180. This value added together becomes a second index value.

A second translation table 182 is a data table in which the second index value is associated with the page number and the like. In the second translation table 182, a second index column 188 indicates second index values. A page number column 190 indicates page numbers. An IOID column 192 indicates the IOID of an access requesting entity where the access thereby is to be permitted for each page. An access condition column 194 indicates access attribute information in the page in question. A detail description of the access attribute information will be given later. Note that the first translation table 180 and the second translation table 182 are set by privilege software of an OS.

The page number at the access destination is identified by the second index value. If the IOID extracted from the access requesting command 162 agrees with the IOID value of the IOID column 192 for the thus identified page, the access to said page is granted. When the access is granted, an offset value is added to the address of the identified page and then a specific physical address is finally identified. Then the access is executed in accordance with the access attribute information indicated in the access condition column 194.

The access attribute information is information with which to condition an access method for the management space, and there are numerous examples as follow.

Whether the Access Sequence is to be Forced

Normally, the access to the recording medium is not necessarily executed in the access sequence and, instead, the access is executed in order in which the memory controller can conveniently execute. The processing method like this is generally called an out-of-order execution or weakly-ordered execution. In the access condition column 194, information by which to specify whether or not access is to be made according to the access requesting sequence instead of the out-of-order execution is contained as the access attribute information. In a case where a page is used where the access sequence is set forcibly, the access to that page is processed using a strict rule such that the access is executed in the order in which all the access requests are made. The processing method like this in which the access sequence is forcibly set is called an in-order execution or strictly order execution. The method for controlling the access sequence can be set for each IOID. Suppose, for instance, that an access requesting entity of IOID=0022 accesses a physical address through a page A and another access requesting entity of IOID=0023 accesses the same physical address through a page B which is different from the page A. Now if in the second translation table 182 the access from the page A is set as a strictly order execution and the access from the page B is set as an out-of-order execution, the control of different access sequences can be done in accordance with an access requesting entity even though they access the same physical address.

Whether to Maintain Cache-Coherency is Necessary

Data of a main storage such as a main memory 140 is accessed via a cache memory. The cache memory is built into the PU 112 or SPU 116. The PU 112 or SPU 116 may also execute a processing using a cache memory capable of achieving a faster access than the main memory 140. The data written to the cache memory is reflected on the main memory. However, depending on the timing of such reflection, there are periods during which the data does not coincide between the cache memory and the main memory.

Information indicating whether the coherence (so-called cache coherency) between the data of cache memory and the data of the main memory 140 or local memory 144, at the time when there is an access request from the external source, is to be maintained or not is contained as the access attribute information.

In the case of a page where the cache coherence maintenance is set, which cache memory has the most updated data is detected by the cache snooping and its own state is changed so that the most updated data can be acquired whenever each cache memory requires. The cache coherence may also be maintained using other known methods such as the directory-based protocol and shared cache.

Whether Write to Page is Permitted

Information indicating whether read only is permitted or read/write is permitted to this page is contained as the access attribute information.

Figure 4:
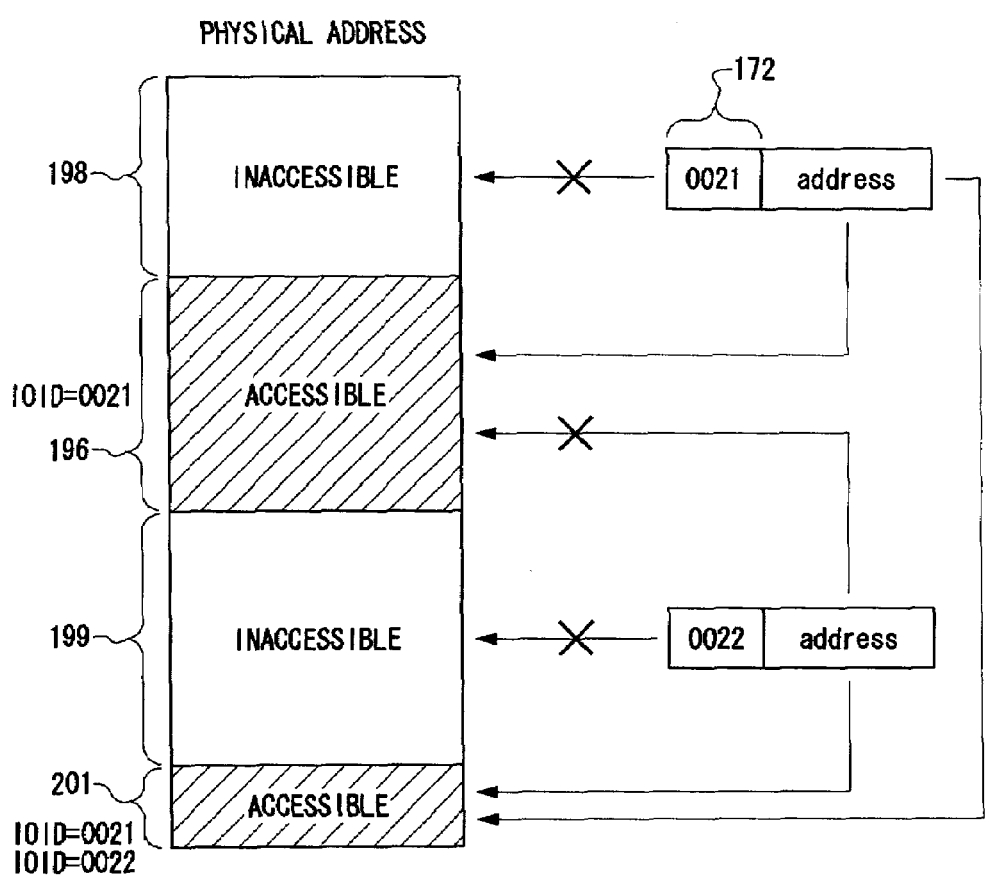
FIG. 4 is a schematic diagram to explain a relationship between a management space and access permission/denial.

FIG. 4 is a schematic diagram to explain a relationship between the management space and the access permission/denial.

The description is based on the assumption that in the access requesting entities the IOID of the image processing DMAC 122 is "0021" and the IOID of the display controller 126 is "0022". In the management space, an inaccessible region 198 and an inaccessible region 199 are regions which the image processing DMAC 122 and the display controller 126 cannot access. These regions are mapped to the local memory 144 or mapped to the main memory 140. The image processing DMAC 122 of IOID "0021" can access an accessible region 196 and an accessible region 201. That is, in the second translation table 182, IOID "0021" is designated to the page mapped into to the accessible region 196 and the accessible region 201, in the IOID column 192.

The access to a region to which the access of the image processing DMAC 122 is prohibited can be prevented by referring to whether or not the IOID "0021" is designated to the page identified by the second translation table 182. By employing a method in which the IOID for uniquely identifying each access requesting entity in the information processing apparatus 100 is checked, the main memory 140 or local memories 144 mapped to the management space are protected against any unauthorized access.

The accessible region 201 undergoes the double mappings from separate pages about the access requesting entities of IOID "0021" and IOID "0022", respectively. One page A is accessed from an image processing side DMAC 122 of IOID "0021" whereas the other page B is accessed from the display controller 126 of IOID "0022". In the second translation table 182, the IOID "0021" is set to the page A whereas the IOID "0022" is set to the page B. Hence, the image processing DMAC 122 of IOID "0021" and the display controller 126 of IOID "0022" are permitted to access the accessible region 201. However, the page through which the image processing DMAC 122 accesses the accessible region 201 differs from the page through which the display controller 126 accesses the same accessible region 201. Accordingly, in the second translation table 182, whether access is permitted or not is set for the management space for each IOID in units of page. That is, the access condition suitable for the access requesting entity can be set for the management space in units of page, so that the storage area is more likely to be protected against the unauthorized access.

Assume that the segment value=100, the page value=10 and the offset value=0 in the image processing DMAC 122 of IOID "0021". Assume that the segment value=200, the page value=10 and the offset value=200 in the display controller 126 of IOID "0022". Assume also that both the respective pages designated indicates the same physical address of "23450000", having the page size of 4 KB, in the accessible region 201. Assume also that the image processing DMAC 122 of IOID "0021" is to access the physical address=23450000 whereas the display controller 126 of IOID "0022" is to access the physical address=23450200 (=23450000+200). Then two different access requesting entities will both be granted to access the accessible region 201

As a modification, two or more IOIDs may be set to a single page. For example, assume that both the IOID "0021" and the IOID "0022" are set to the IOID column 192 for the page A mapped to the accessible region 201. Then both the image processing side DMAC 122 of IOID "0021" and the display controller 126 of IOID "0022" can access the accessible region 201 via the page A.

Even if the address designated by the access requesting command 162 is one such that a physical address is directly designated, the check by the IOID will function effectively. In the present embodiment, an independent address space can be used in accordance with a rule such that the address designated by the access requesting command 162 serves as a logical address where a physical address is not directly designated. Thus, robustness against the unauthorized access can be further enhanced.

Even if it is the page contained in the accessible region 196, it goes without saying that the write processing is prohibited for an write-protected address region as access attribute information even if an access requesting entity has a valid IOID.

Figure 5:
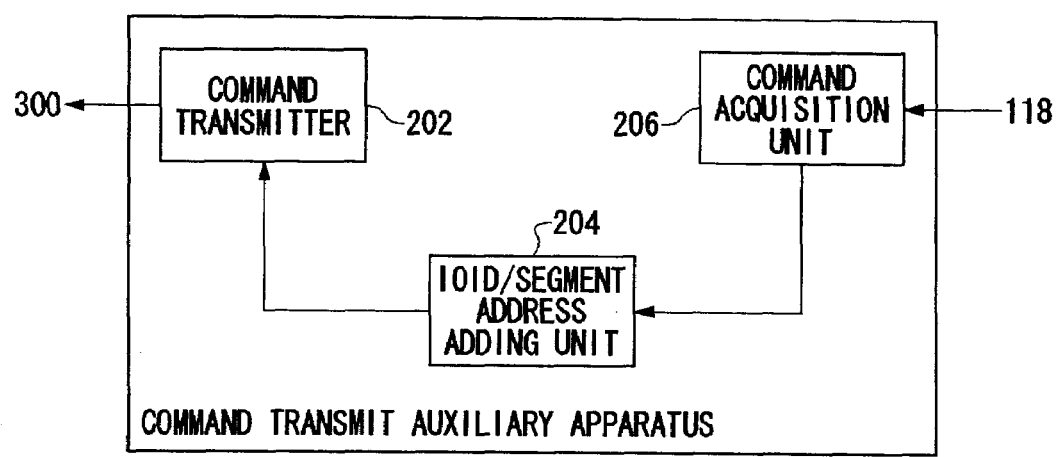
FIG. 5 is a functional block diagram of a command transmit auxiliary apparatus.

FIG. 5 is a functional block diagram of a command transmit auxiliary apparatus 200. The command transmit auxiliary apparatus 200 includes a command transmitter 202, an IOID/segment address adding unit 204 and a command acquisition unit 206.

The command acquisition unit 206 acquires commands from the access requesting entities. The access requesting entity sends an address indicative of an access destination in a management space (hereinafter referred to as "original address"), a command indicative of read or write and a DMA requester ID (hereinafter referred to as "DMARID") described later to the command acquisition unit 206. DMARID is an ID to identify a DMA requester and the detail thereof will be discussed later. The command acquisition unit 206 acquires commands, original addresses and DMARIDs.

The IOID/segment address adding unit 204 receives commands, original addresses and DMARIDs from the command acquisition unit 206, and then generates access requesting commands 162. Here, the IOID/segment address adding unit 204 adds an IOID to identify an access requesting entity, to the access requesting commands 162. It also adds segment addresses described later. In this rule, the command transmitter 202 transmits to the I/O access control apparatus 300 the access requesting commands 162 that contain at least the IOIDs, the logical addresses of the access destinations and commands. The command transmitter 202 transmits the access requesting commands to the I/O access control apparatus 300.

Figure 6:
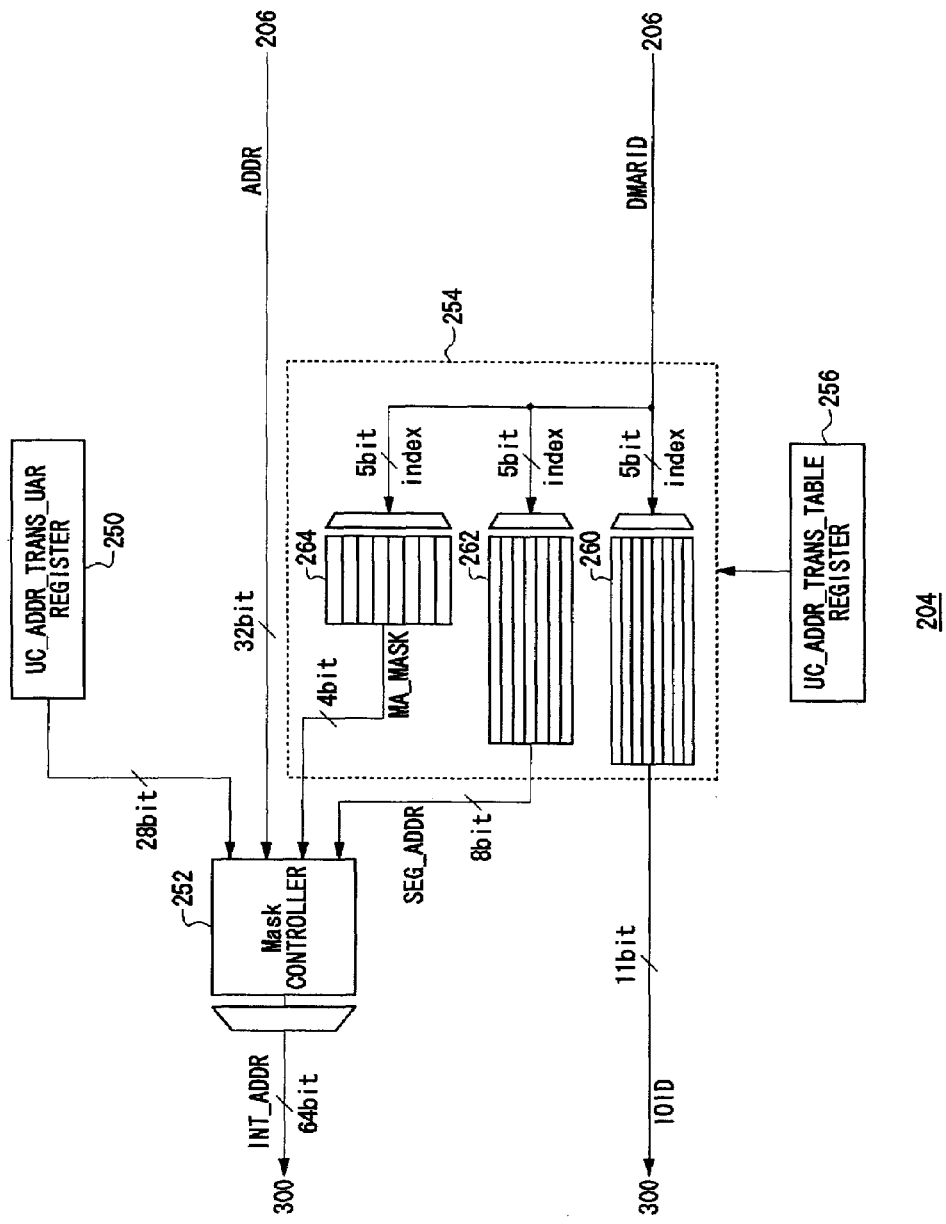
FIG. 6 is a schematic diagram showing processing contents of an IOID/segment address adding unit.

FIG. 6 is a schematic diagram showing processing contents of the IOID/segment address adding unit 204. The IOID/segment address adding unit 204 includes a UC_ADDR_TRANS_UAR register 250, a mask controller 252, a translation unit 254, and US_ADDR_TRNS_TABLE register 256.

The original address designated by the access requesting entity is inputted to the mask controller 252 via the command acquisition unit 206. Each access requesting entity is given an ID, so-called DMARID, different from IOID. DMARID serves the purpose as long as it is an ID with which the command transmit auxiliary apparatus 200 can uniquely identify the access requesting entity. However, the DMARID of each access requesting entity may differ depending on a system configuration or manufacturing period of a product. For example, the DMARID of a display controller 126 in the system configuration A may be "10225" whereas the DMARID of a display controller 126 in the system configuration B may be "00452". Even for the display controllers 126 of the same system configuration A, the DMARID thereof may differ depending on the manufacturing period. In the light of this, the IOID is an ID with which to identify the display controller 126 from the other access requesting entities irrespective of the type or manufacturing period of the display controller 126. The DMARID is converted to an IOID by the IOID translation table 260. The display controller 126 of the system configuration A and the display controller of the system configuration B may both be converted to the IOID of "0022" by the IOID translation table 260. That is, in the information processing apparatus 100 the IOID is an ID by which to identify the type of an access requesting entity. That the access requesting entity of the IOID "0022" corresponds to the display controller 126 can be set by an OS.

As described above, the I/O access control apparatus 300 in the overall control unit 110 determines whether the access is granted to the management space by the IOID or not. The I/O access control apparatus 300 may determine whether the access is granted or not, based on the DMARID instead of the IOID. When the access control is done based on the DMARID, the I/O access control apparatus 300 needs to know which kind of DMA requester is being introduced as an access entity and which DMARID is being registered. In this regard, since the I/O access control apparatus 300 according to the present embodiment operates based on the IOID associated beforehand with the type of the access requesting entity, it does not need to be concerned about what particular product the access requesting entity identified by said IOID is. That is, the IOID is a globally identified ID, so to speak, in the information processing apparatus 100. The IOID translation table 260 is a table for which various DMARIDs are converted into IOIDs. By the IOID translation table 260, the abstraction of a system configuration viewed from the overall control unit 110 which constitutes a receiving side of the access requesting command 162 can be realized. The conversion rule of the IOID translation table 260 can be set by privilege software of an OS via the UC_ADDR_TRANS_TABLE register 256. Thus, the only change in setting the IOID translation table 260 by the UC_ADDR_TRANS_TABLE register 256 can cope with the change of the system configuration.

Similarly, in a segment selection table 262, 8-bit segment address (SEG_ADDR) is selected based on the DMARID. In a mask translation table 264, a mask bit of 4 bits (MA_MASK) is selected based on a 5-bit a DMARID. The privilege software can set the values of the segment selection table 262 or mask selection table 264 via the UC_ADDR_TRANS_TABLE register 256. The IOID converted by the IOID translation table 260 becomes part of the access requesting command 162, as described above. The 8-bit SEG_ADDR, 4-bit MA_MASK, 32-bit original address (ADDR) of an access destination to which the access requesting entity has originally designated and 28-bit preset value of UC_ADDR_TRANS_UAR register 250 are inputted to the mask controller 252. The mask controller 252 produces a 64-bit intermediate address (INT_ADDR) by the use of a processing method illustrated in FIG. 7. The IOID/segment address adding unit 204 adds the 11-bit IOID and commands so as to produce the access requesting command 162.

Figure 7:
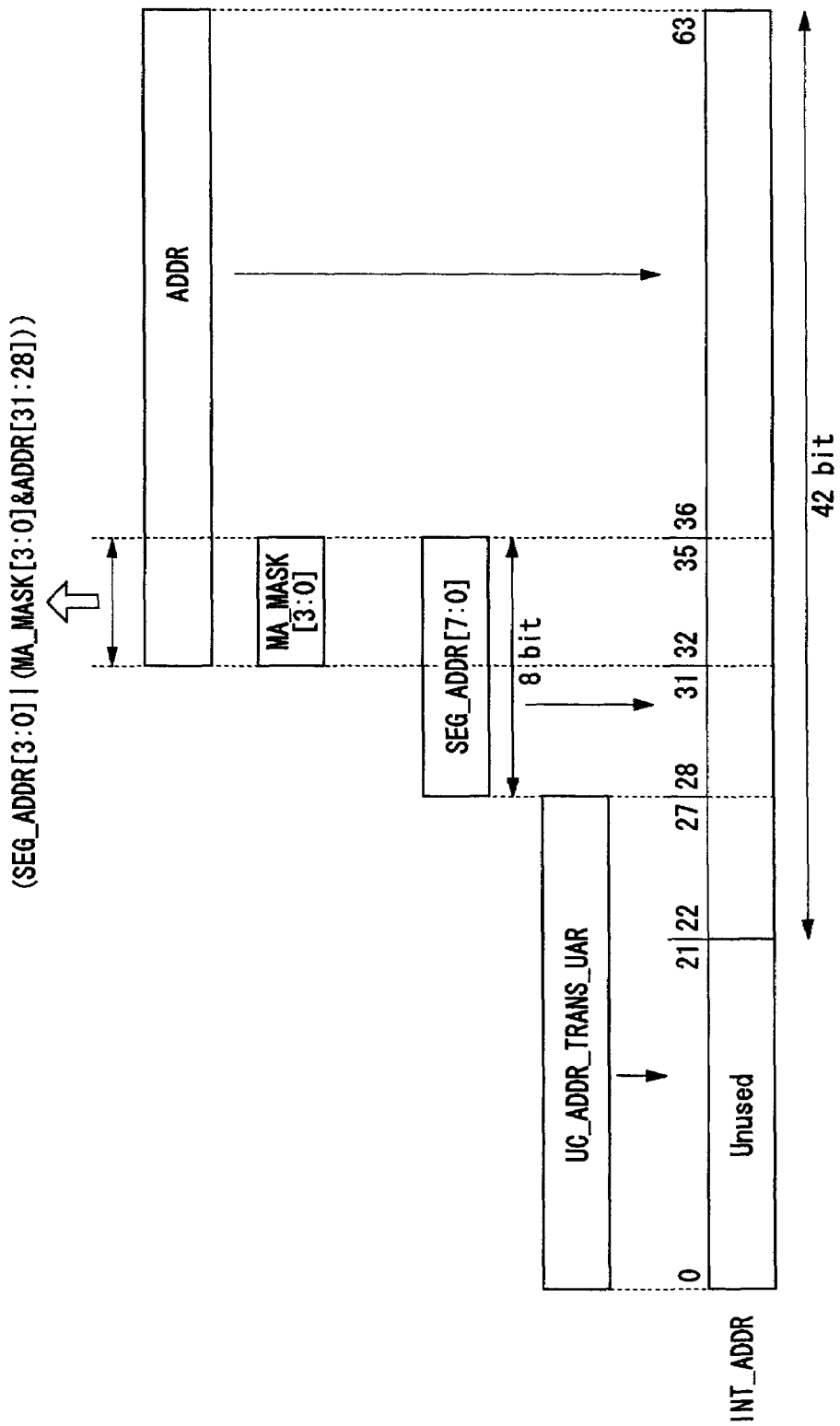
FIG. 7 is a schematic diagram showing a method for producing an intermediate address.

FIG. 7 is a schematic diagram showing a method for producing an intermediate address (INT_ADDR). The intermediate address (INT_ADDR) is of 64 bits where the 0th to the 27th bit are preset values outputted from the UC_ADDR_TRANS_UAR register 250. The privilege software can also set the UC_ADDR_TRANS_UAR register 250. Four bits of the 28th to the 31st bit are higher-order 4 bits of SEG_ADDR. Twenty eight bits of the 36th bit to 63rd bit are lower-order 28 bits. The 32nd to 35th bit are the result of the logical sum (OR) of the 4-bit value of logical product (AND) of the upper-order 4 bits of ADDR and MA_MASK, and the low-order 4 bits of SEG_ADDR. In this rule, the intermediate address of 64 bits in total is produced. In the present embodiment, the 0th bit to 27th bit of the intermediate address (INT_ADDR) are reserved regions whereas the 28th bit to the 63rd bit are the address regions.

Figure 8:
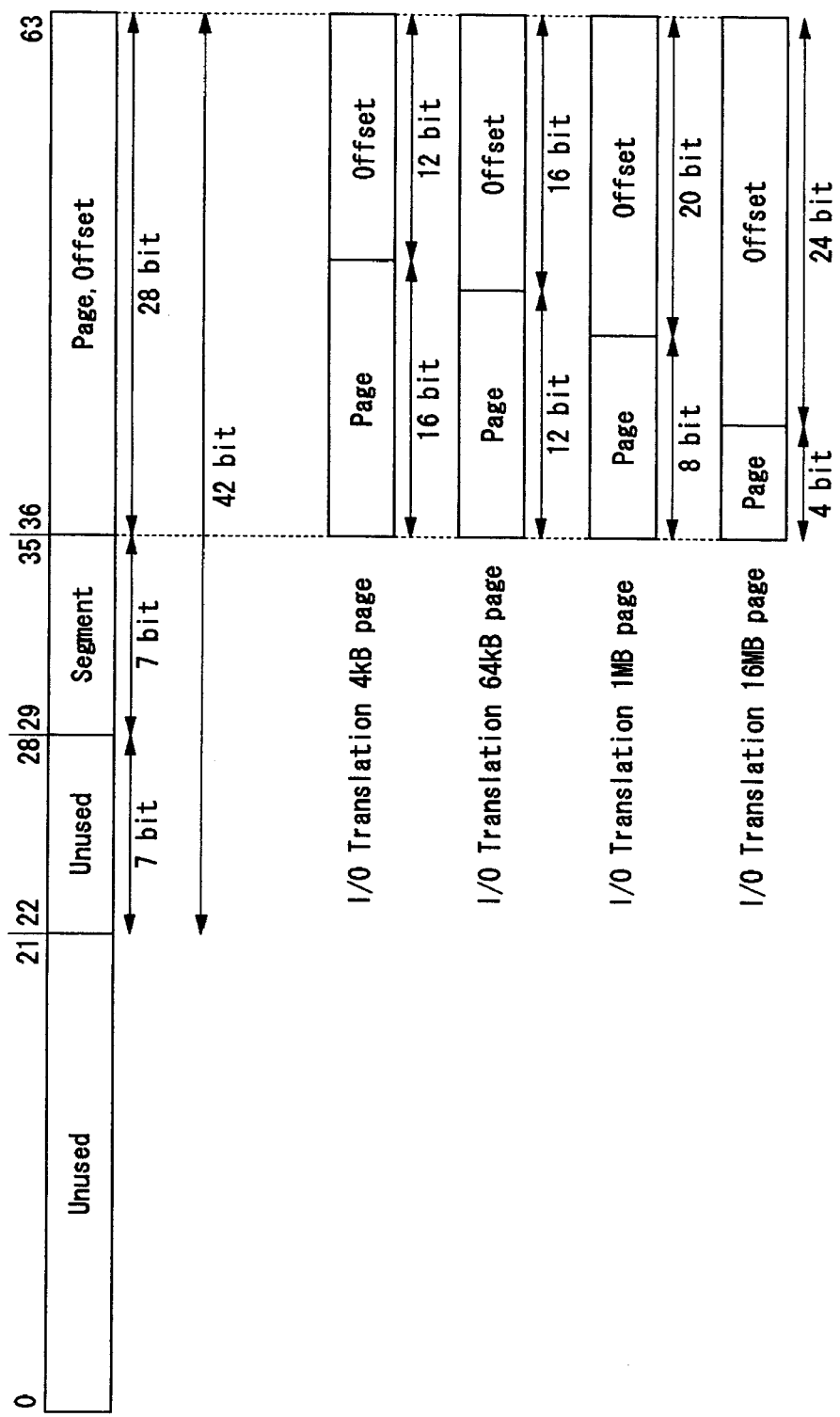
FIG. 8 illustrates relationships among a segment, a page and an offset of an address region in an intermediate address.

FIG. 8 illustrates relationships among a segment, a page, and an offset of the address region 170 in an intermediate address (INT_ADDR).

When the page size is 4 KB, the page address width is 16 bits and the number of pages is 65,536. When the page size is 64 KB, the page address width is 12 bits and the number of pages is 4,096. When the page size is 1 MB, the page address width is 8 bits and the number of pages is 256. When the page size is 16 MB, the page address width is 4 bits and the number of pages is 16. The size of page in use is determined by the page size column 185 of the first translation table 180. In this rule, a plurality of page sizes can be supported in the access requesting command 162.

Figure 9:
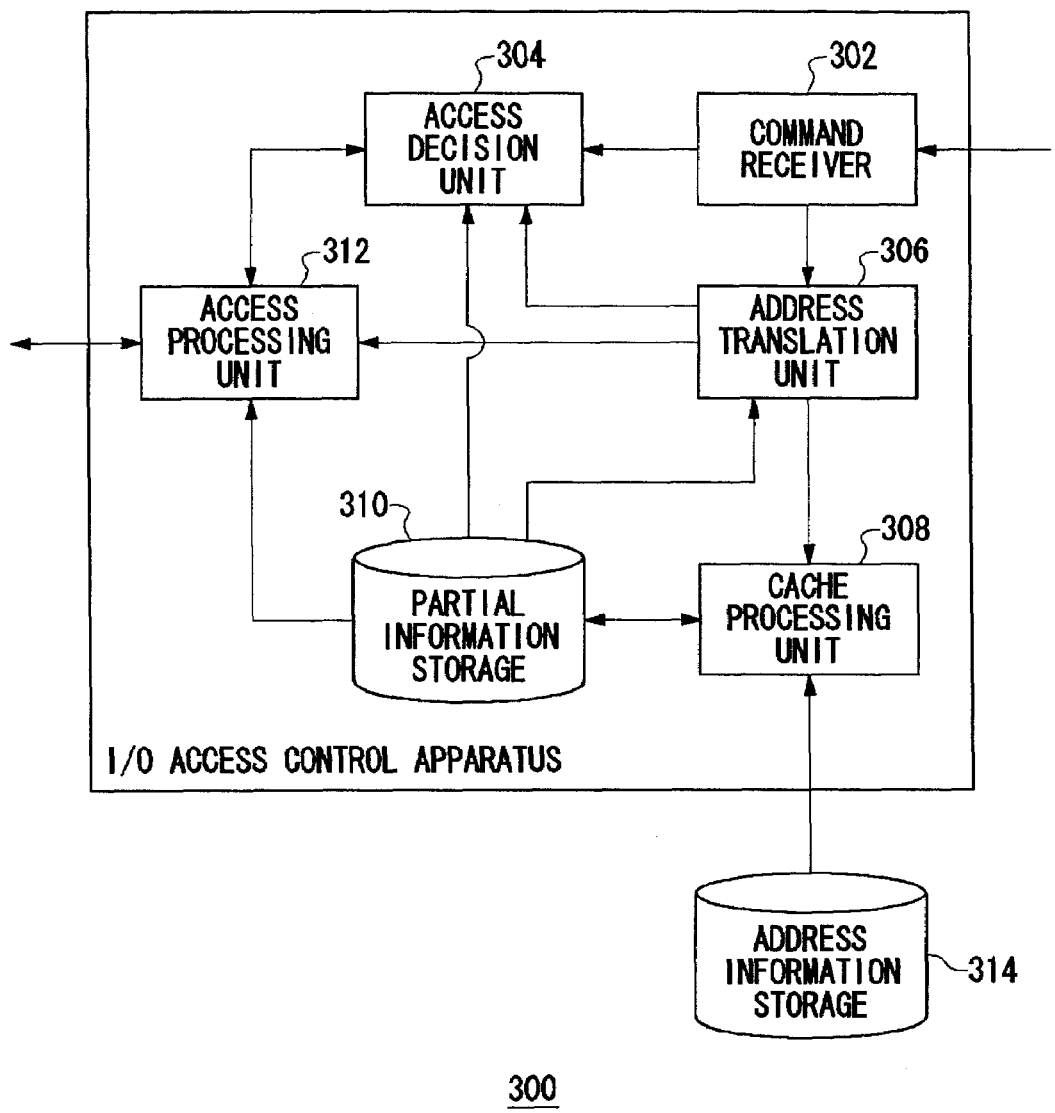
FIG. 9 is a functional block of the I/O access control apparatus.

FIG. 9 is a functional block of the I/O access control apparatus 300. The I/O access control apparatus 300 includes a command receiver 302, an access decision unit 304, an address translation unit 306, a cache processing unit 308, a partial information storage 310 and an access processing unit 312.

The command receiver 302 receives an access requesting command 162 transmitted from the command transmit auxiliary apparatus 200. The cache processing unit 308 loads part of data of the first translation table 180 or second translation table 182 shown in FIG. 3 into the partial information storage 310.

The address information storage 314 may be constituted as part of the main memory 140. The partial information storage 310 may be constituted by a built-in cache capable of accessing faster than the address information storage 314. In what is to follow, the first translation table 180 and/or the second translation table 182 stored in the address information storage 314 will be collectively referred to as "address translation table". Part of the address translation table loaded into the partial information storage 310 will be referred to as "partial translation table" in distinction from the address translation table.

The operation of data transfer by the cache processing unit 308 between the partial information storage 310 and the address information storage 314 is called "refill" also.

The address translation unit 306 translates a logical address into a physical address by referring to the partial translation table stored in the partial information storage 310. The conversion method was explained with reference to FIG. 3. When data necessary for converting a logical address into a physical address is not contained in the partial translation table stored in the partial information storage 310, the cache processing unit 308 refills anew the partial translation table containing said part from the address information storage 314 to the partial information storage 310. The physical address identified by the address translation is conveyed to the access processing unit 312 and the access decision unit 304.

The access decision unit 304 determines whether the IOID matches for the page identified in the address translation unit 306 or not. In other words, the access decision unit 304 determines if it is an accessible region or not. The decision result is conveyed to the access processing unit 312. On the condition that the access has been granted by the access decision unit 304, the access processing unit 312 executes access to the management space, by a command designated for a physical address conveyed from the address translation unit 306. In so doing, the access decision unit 304 executes access according to the access attribute information designated for the page. The access destinations of the access processing unit 312 are storage media, such as the main memory 140 or local memory 144, which have been mapped to the management space of the PU 112.

Out of the access requests of various access requesting entities, the access processing unit 312 stores effective ones in a cue. The access processing unit 312 retrieves sequentially an access request from the cue and then executes access to the management space. It is possible that the access processing unit 312 executes access to the local memory 144 by the DMA requester B while access to the main memory 140 by the DMA requester A is being executed. In this rule, the access processing unit 312 can execute, in parallel, a plurality of types of accesses by a plurality of DMA requesters.

Note that the I/O access control apparatus 300 may be so configured as to contain a portion corresponding to the address information storage 314.

The partial information storage 310 manages the data in units of block wherein this block (often called "line" also) is of a certain fixed size. The address information storage 314 also manages the data in units of block having a certain fixed size. Data of any block of the address information storage 314 is stored in each block of the partial information storage 310. The block size of the address information storage 314 is larger than the block size of the partial information storage unit 310. Accordingly, part of data of a block in the address information storage 314 is stored in a block of the partial information storage 310.

In the present embodiment, the cache processing unit 308 loads the data of a partial translation table into the partial information storage 310 by using the direct mapped method for the first translation table 180 and the 4-way set associative method for the second translation table 182. Note that the refill may be done using a known method such as the fully associative method.

It is possible that the partial information storage 310 according to the present embodiment stores a number of kinds of partial translation tables. In other words, a plurality of kinds of physical address ranges are stored as the partial translation table, from the address translation table. The cache processing unit 308 may constantly refill one or more kinds of partial translation tables corresponding to a predetermined logical address range. When data necessary for the address translation are contained in the partial translation table stored in the partial information storage 310, namely when there is a hit, the address translation unit 306 identifies the physical address by referring to the partial translation table thereof. In such a case, the address translation processing can be performed in a rule such that the access to the partial information storage 310 only is made where the high-speed access is possible compared to the address information storage 314. That a partial translation table is refilled beforehand into the partial information storage 310 prior to the execution of address translation is called "look-ahead refill". The look-ahead refill may be executed by the privilege software of an OS.

On the other hand, when the address translation could not be executed with the partial translation table stored in the partial information storage 310 by the look-ahead refill, namely at the time of a miss hit, the cache processing unit 308 loads a new partial translation table into the partial information storage 310. Then the address translation unit 306 identifies the physical address by referring to this newly refilled partial translation table. Such a refill of the partial translation table which is executed when a miss hit has occurred is called "look-behind refill".

In the present embodiment, even when a miss hit has occurred in a look-ahead-refilled partial translation table, a new partial translation table is look-behind refilled while the look-ahead-refilled partial translation table is being held in the partial information storage 310.

The partial translation table which has been look-ahead refilled may be in a state where the partial translation table is locked in the partial information storage 310. The partial translation table being locked will not be removed from the partial information storage 310. Accordingly, the partial translation table being locked will not be overwritten by the newly refilled partial translation table. At the same time, the partial translation table which is not locked may possibly be removed from the partial information storage 310 as a result of the new refilling. By implementing such a method described above, the refill based on predictions by the look-ahead refill and that based on received access requests by the look-behind refill can be effectively used and combined in parallel.

According to the present embodiment, the merit gained by the prediction called the look-ahead refill is enjoyed and at the same time the look-behind refill at a miss hit is executed, so that the hit rate is likely to be raised as a whole.

For example, if the partial information storage 310 enables the storage of four kinds of partial translation tables, two of them may be look-ahead-refilled partial translation tables and the remaining two may be look-behind-refilled partial translation tables. Hereinafter, the storage area of the look-ahead-refilled partial translation table will be called a look-ahead area whereas that of the look-behind-refilled partial translation table a look-behind area. If a look-ahead refill is executed anew, the partial translation table in the look-ahead area will be replaced. If a look-behind refill is executed anew, the partial translation table in the look-behind area will be replaced. As an algorithm used to remove the partial translation table in the partial information storage 310 from the partial information storage 310 at the time of a refill, a known algorithm such as round-robin, least-recently-used (LRU) and random algorithm may be used.

Figure 10:
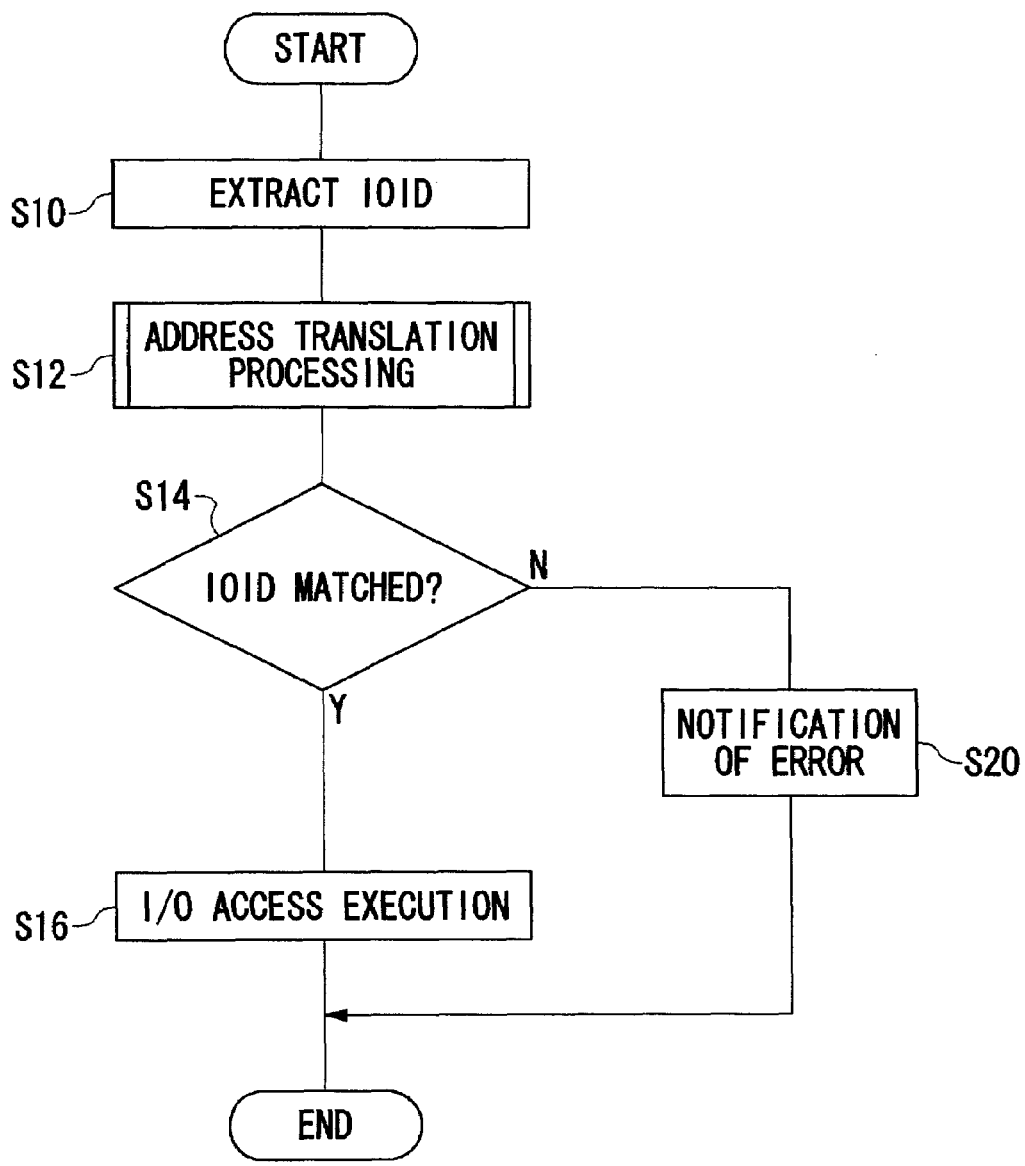
FIG. 10 is a flowchart showing an access control process by the I/O access control apparatus.

FIG. 10 is a flowchart showing an access control process by the I/O access control apparatus 300. The command receiver 302 extracts IOIDs from the received access requesting commands 162 (S10). The address translation unit 306 translates logical addresses into physical addresses (S12). The processing of S12 will be described in detail later with reference to FIG. 11. The access decision unit 304 determines whether or not the IOID of an access requesting command 162 agrees with the IOID of a page identified by the second translation table 182 (S14). If agreed (Y of S14), the access processing unit 312 will execute the access to the management space according to the access attribute information (S16). If not (N of S14), the access processing unit 312 notifies to the command transmit auxiliary apparatus 200, which is a sender, about the error (S20). The notification of error may be conveyed to the OS as error message in the form of event notification. In this case, the access will be denied.

Figure 11:
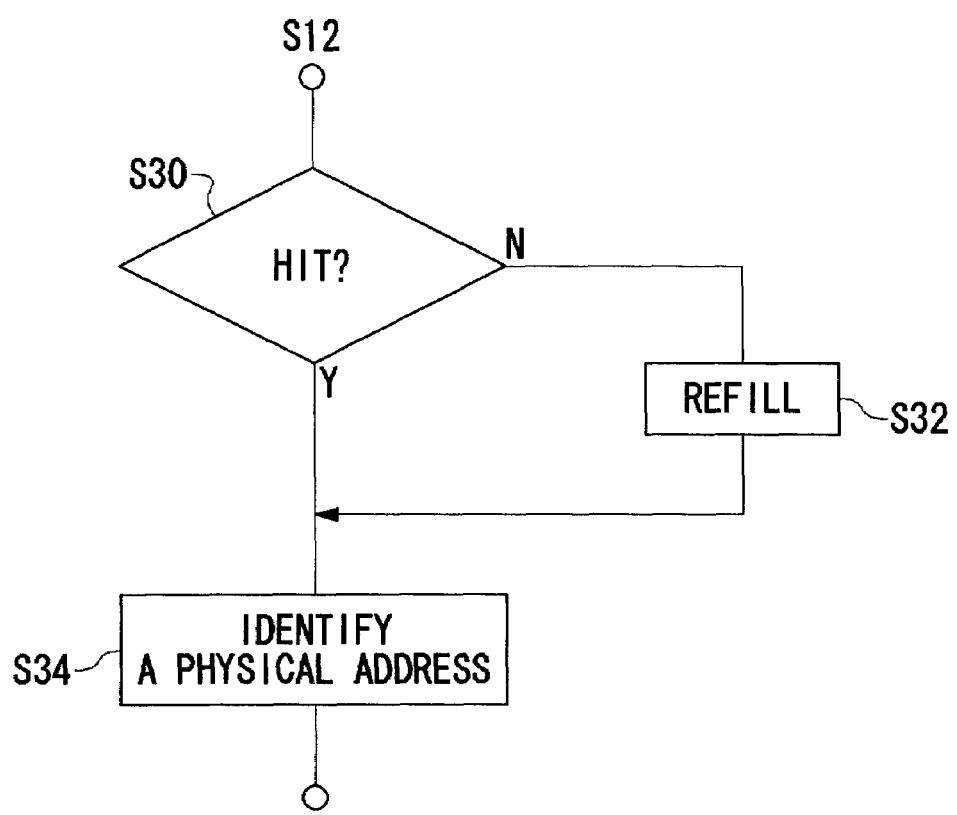
FIG. 11 is a flowchart showing in a detail an address translation processing in Step 12 of FIG. 10.

FIG. 11 is a flowchart showing in a detail an address translation processing in Step 12 of FIG. 10. Firstly, the address translation unit 306 determines whether or not it is possible to convert the address by a partial translation table refilled in the partial information storage 310, namely whether the address is hit or not (S30). If hit (Y of S30), the address translation unit 306 will identify a physical address by referring to said partial translation table (S34). If miss hit (N of S30), the cache processing unit 308 will look-behind refill the partial translation table in question (S32). Then the physical address will be identified by the use of the partial translation table which has been look-behind refilled (S34).

By employing the methods according to the present embodiments as described above, all of the access requesting entities can be placed under the total management of the I/O access control apparatus 300, using the IOIDs. Accordingly, the I/O access control apparatus 300 can prevent beforehand any unauthorized access from the external DMA requesters. No matter which kind of product a DMA requester introduced into the information processing apparatus 100 is and no matter what policy is implemented to set the DMARIDs, the command transmit auxiliary apparatus 200 can append unique IOIDs to the DMA requesters under management. As was explained with reference to FIG. 6, the IOID, SEG_ADDR or MA_MASK can be arbitrarily set through privilege software. As a result, no matter how many or what kind of DMA requesters exist externally, the respective DMA requesters can be integrally managed by referring to the IOIDs of the access requesting commands 162.

According to such a processing method, the privilege software can place a device driver that controls DMA requesters, under control. In a conventional case of two-layer OS model composed of kernel layer and user layer, the device driver is of a lower layer than the user layer, so that a storage region is accessed by directly specifying a physical address. In contrast therewith, the three-layer model as in the present embodiment allows the access to the management space by a logical address. This is because the device driver does not directly access the storage area but, instead, it is operated in a software layer different from the privilege software. The privilege software sets a logical address in the address region 170 according to the type of OS operated in the kernel layer. For instance, suppose that the OS-A and the OS-B operate on the kernel layer. At the time of operation under OS-A, the privilege software may set the first translation table 180 and second translation table 182, in response to the OS-A. At the time of operation under OS-B, the privilege software may set them in response to the OS-B. Under such a multi-OS circumstance, the logical address designated by the DMA requester can be converted into a different physical address according to the OS.

The processing method according to the present embodiments is also advantageous in that the development efficiency for programmers can be improved. If programs for controlling the I/O device 160 such as a device driver is created, logical addresses will be used. And if they follow a scheme of IOIDs, the abstracted environment independent from other software can be provided, so that the burden on the development can be reduced.

Once the privilege software has set the first translation table 180 and the second translation table 182, the access permission/denial and the access condition by use of access attribute information can be managed in units of page. Hence, the I/O access control apparatus can be meticulously controlled by merely referring to these tables.

In recent years, many of commercial programs are prepared as a set of software modules provided from a number of programmers or third parties and therefore the access control for memory requires all the more an accurate design. Accordingly, the method described in the present embodiment is effective in meeting such a demand.

The device driver can use the logical addresses. Thus, the DMA requester can perform the data transfer directly and continuously on an area, for use with data transfer, which is noncontiguous on a physical address secured by software of a user layer but is contiguous on a logical address per page.

In the conventional methods, the DMA requester can use physical addresses only. Thus, if the data transfer area is noncontiguous on a physical address per page, the data transfer of DMA needs to be segmented in accordance with such a noncontiguous area. Alternatively, OS needs to manage the area in advance so that the physical address is contiguous in the data transfer area used by the DMA requester.

Furthermore, the first translation table 180 or the second translation table 182, provided as an address translation table, contains address attribute information which determines the access permission/denial by IOIDs and access method. As a result, each processing such as the address translation and access permission/denial determination can be executed efficiently. This is because if data necessary for the address translation are contained in the refilled partial translation table, a processing such as access permission/denial determination or specification of access condition can be done using its partial translation table.

Further, according to the present embodiments, the partial information storage 310 can execute the look-behind refill in a state where the partial translation table which has been look-ahead refilled is being held, so that the hit rate can be raised.

The present invention has been described based on the embodiments. These embodiments are merely exemplary, and it is understood by those skilled in the art that various modifications to the combination of each component and process thereof are possible and that such modifications are also within the scope of the present invention.

While not intended to limit the scope of the claims, the following associations between claimed elements and disclosed structure in the above specification are provided by way of example: The access requesting entity may correspond to the image processing DMAC 122, or the like in the present embodiments The access permission/denial determination table may correspond to the IOID column 192, in particular, of the second translation table 182 in the present embodiments. The address information storage 314 in the present embodiments may fulfill the function of an address translation table memory. The partial information storage 310 in the present embodiments may achieve the function of the cache memory, into which the partial translation table is loaded by the cache processing unit. The access attribute table may correspond to the access condition column 194, in particular, of the second translation table 182 in the present embodiments. The partial information storage 310 or the address information storage 314 in the present embodiments may achieve the function of an access attribute table memory. The "software that controls the access requesting entity and said apparatus in a unified manner and under a strict rule" may correspond to OS or privilege software. The unique ID for the access requesting entity may correspond to DMARID in the present embodiments.

It is also understood by those skilled in the art that the function to be achieved by each claimed element may be realized by a single unit of each functional block indicated in the present embodiments or in linkage with those.

While the preferred embodiments of the present invention have been described using specific terms, such description is for illustrative purposes only, and it is to be understood that changes and variations may be further made without departing from the spirit or scope of the appended claims

What is claimed is:

1. An I/O access control apparatus, comprising:
a command receiver which receives, from an external access requesting entity, a command for controlling data in a memory space of a processor, together with address information used to specify an address to be accessed and ID information used to identify the access requesting entity;
an access decision unit which determines whether access of the access requesting entity to an address specified by the address information is permitted or not, by referring to an access permission/denial determination table that associates an address in the memory space with ID information on an access requesting entity which is to be permitted to access a region specified by the address; and
an access processing unit which executes access of the access requesting entity to the memory space, on the condition that the access has been permitted by said access decision unit,
wherein said access decision unit determines, per page which is a unit of basic management in the memory space, whether access of the access requesting entity is permitted or not, and
wherein in a case where plurality of access requesting entities transmit commands to access different pages, said access processing unit is capable of executing accesses to the different pages by the plurality of access requesting entities parallely in time.

2. An I/O access control apparatus according to claim 1, wherein the access permission/denial determination table is set by software that controls the access requesting entity and said apparatus in a unified manner.

3. An I/O access control apparatus according to claim 1, wherein the access requesting entity is a direct memory access (DMA) requester that controls data, in a memory space of a processor, by a DMA transfer.

4. An I/O access control apparatus according to claim 1, wherein said access decision unit is capable of using a plurality of pages with different sizes.

5. An I/O access control apparatus according to claim 1, wherein pages to which different access requesting entities are accessible can be set in the access permission/denial determination table.

6. An I/O access control apparatus, comprising:
a command receiver which receives, from an external access requesting entity, a command for controlling data in a memory space of a processor, together with address information used to specify an address to be accessed and ID information used to identify the access requesting entity;
an access decision unit which determines whether access of the access requesting entity to an address specified by the address information is permitted or not, by referring to an access permission/denial determination table that associates an address in the memory space with ID information on an access requesting entity which is to be permitted to access a region specified by the address;
an access processing unit which executes access of the access requesting entity to the memory space, on the condition that the access has been permitted by said access decision unit;
an address translation table storage which stores an address translation table to translate a logical address into a physical address, wherein the address information is information indicative of the logical address which is a virtual address converted from an address of the memory space into a predetermined format;
an address translation unit which translates the logical address specified by the address information into a physical address by referring to the address translation table; and
a cache processing unit which loads beforehand a partial translation table which is a part corresponding to a predetermined logical address range in the address translation table, into a cache memory from said address translation table storage, prior to address translation by said address translation unit,
wherein said access processing unit executes the access of the access requesting entity based on the physical address identified by said address translation unit,
wherein when data necessary for converting a logical address specified by the address information into a physical address is contained in the loaded partial translation table, said address translation unit performs address translation by referring to the partial translation table, and
wherein when the data necessary for converting a logical address specified by the address information into a physical address is not contained in the loaded partial translation table, said cache processing unit loads a new partial translation table into the cache memory from said address translation table storage.

7. An I/O access control apparatus according to claim 6, wherein the address translation table is set by software that controls the access requesting entity and said apparatus in a unified manner.

8. An I/O access control apparatus according to claim 6, wherein the address translation table includes, as part of contents thereof, table data corresponding to the access permission/denial determination table and is formed as a data table that associates the logical address and physical address with ID information on an access requesting entity which is to be permitted to access a region specified by the address.

9. An I/O access control apparatus according to claim 6, wherein the address translation table is set so that a plurality of access requesting entities are capable of accessing an identical physical address region through pages of different logical addresses, respectively.

10. An I/O access control apparatus according to claim 6, wherein when the data necessary for converting a logical address specified by the address information into a physical address is not contained in the partial translation table loaded beforehand prior to execution of the address translation, said cache processing unit loads a new partial translation table into the cache memory in a state where the partial translation table is being held in the cache memory.

11. A command transmit auxiliary apparatus, comprising:
an ID adding unit which assigns ID information to identify a predetermined access requesting entity, to a command for controlling data, in a memory space of a processor, sent from the access requesting entity together with address information used to specify an address to be accessed in the memory space of a processor;
a command transmitter which transmits the command to which the ID information has been assigned, to an external device, wherein the external device determines whether access of the access requesting entity to the address specified by the address information is to be permitted or not, by referring to an access permission/denial determination table that associates an address of the memory space and ID information on an access requesting entity whose access to a region specified by said address of the memory space is permitted; and
a segment address generator which generates a segment address in a manner that a unique ID for the access requesting entity is converted by use of a predetermined segment generation table,
wherein said ID adding unit produces the ID information in a manner that a unique ID for the access requesting entity is converted by use of a predetermined ID generation table, and
wherein said command transmitter transmits the command in a manner that the segment address is contained in part of the address information.

12. A command transmit auxiliary apparatus according to claim 11, wherein a conversion rule of the ID generation table is capable of being set by software that controls the access requesting entity and the external device in a unified manner.

13. A command transmit auxiliary apparatus according to claim 11, wherein the ID information is assigned, for each access requesting entity, by software that controls the access requesting entity and the external device in a unified manner.

14. A command transmit auxiliary apparatus according to claim 11, wherein the segment generation table is capable of being set by software that controls the access requesting entity in a unified manner.

15. A method for controlling I/O access, comprising:
receiving, from an external access requesting entity, a command for controlling data in a memory space of a processor, together with address information used to specify an address to be accessed and ID information used to identify the access requesting entity;
determining whether access of the access requesting entity to an address specified by the address information is permitted or not, by referring to an access permission/denial determination table that associates an address in the memory space with ID information on an access requesting entity which is to be permitted to access a region specified by the address;
executing access of the access requesting entity to the memory space, on the condition that the access has been permitted by said determining;
translating a logical address specified by the address information into a physical address by referring to an address translation table to translate the logical address into the physical address wherein the address information is information indicative of the logical address which is a virtual address converted from an address of the memory space into a predetermined format; and
loading beforehand a partial translation table which is a part corresponding to a predetermined logical address range in the address translation table, into a cache memory, prior to the execution of address translation,
wherein said determining is such that whether access of the access requesting entity is permitted or not is determined per page which is a unit of basic management in the memory space,
wherein the access of the access requesting entity is executed based on the physical address identified by the address translation table,
wherein when data necessary for converting a logical address specified by the address information into a physical address is contained in the loaded partial translation table, the address translation is performed by referring to the partial translation table, and
wherein when the data necessary for converting a logical address specified by the address information into a physical address is not contained in the loaded partial translation table, a new partial translation table is loaded into the cache memory.

16. A method for controlling I/O access according to claim 15, wherein a different size of page is capable of being used per page.

17. A method for controlling I/O access according to claim 15, wherein the address translation table includes, as part of contents thereof, table data corresponding to the access permission/denial determination table and is formed as a data table that associates the logical address and physical address with ID information on an access requesting entity which is to be permitted to access a region specified by the address.

18. A method for controlling I/O access according to claim 15, wherein the address translation table is set so that a plurality of access requesting entities are capable of accessing an identical physical address region through pages of different logical addresses, respectively.

19. A method for controlling I/O access according to claim 15, wherein when the data necessary for converting a logical address specified by the address information into a physical address is not contained in the partial translation table loaded beforehand prior to execution of the address translation, a new partial translation table is loaded into the cache memory in a state where the partial translation table is being held in the cache memory.

20. A command transmit auxiliary method, comprising:
assigning ID information to identify a predetermined access requesting entity, to a command for controlling data, in a memory space of a processor, sent from the access requesting entity together with address information used to specify an address to be accessed in the memory space of a processor;
transmitting the command to which the ID information has been assigned, to an external device, wherein the external device determines whether access of the access requesting entity to the address specified by the address information is to be permitted or not, by referring to an access permission/denial determination table that associates an address of the memory space and ID information on an access requesting entity whose access to a region specified by said address of the memory space is permitted, and
generating a segment address in a manner that a unique ID for the access requesting entity is converted by use of a predetermined segment generation table, wherein the ID information is produced in a manner that a unique ID for the access requesting entity is converted by use of a predetermined ID generation table, and wherein the command is transmitted in a manner that the segment address is contained in part of the address information.

21. A computer-readable recording medium which stores a computer product for controlling I/O access, the product comprising:

a receiving code module for receiving, from an external access requesting entity, a command for controlling data in a memory space of a processor, together with address information used to specify an address to be accessed and ID information used to identify the access requesting entity;

a determining code module for determining whether access of the access requesting entity to an address specified by the address information is permitted or not, by referring to an access permission/denial determination table that associates an address in the memory space with ID information on an access requesting entity which is to be permitted to access a region specified by the address; and an accessing code module for executing access of the access requesting entity to the memory space, on the condition that the access has been permitted by the determining code module, wherein the determining code module determines, per page which is a unit of basic management in the memory space, whether access of the access requesting entity is permitted or not, and wherein in a case where a plurality of access requesting entities transmit commands to access different pages, the accessing code module is capable of executing accesses to the different pages by the plurality of access requesting entities parallely in time.

22. A computer-readable recording medium which stores a computer product for assisting the transmission of commands, the product including:

a assigning code module for assigning ID information to identify a predetermined access requesting entity, to a command for controlling data, in a memory space of a processor, sent from the access requesting entity together with address information used to specify an address to be accessed in the memory space of a processor;

a transmitting code module for transmitting the command to which the ID information has been assigned, to an external device, wherein the external device determines whether access of the access requesting entity to the address specified by the address information is to be permitted or not, by referring to an access permission/denial determination table that associates an address of the memory space and ID information on an access requesting entity whose access to a region specified by said address of the memory space is permitted; and a segment-address-generating code module which generates a segment address in a manner that a unique ID for the access requesting entity is converted by use of a predetermined segment generation table, wherein the ID information is produced in a manner that a unique ID for the access requesting entity is converted by use of a predetermined ID generation table, and wherein said transmitting code module transmits the command in a manner that the segment address is contained in part of the address information.

* * * * *

UNITED STATES PATENT AND TRADEMARK OFFICE
CERTIFICATE OF CORRECTION

| | | |
|---|---|---|
| PATENT NO. | : 7,610,464 B2 | Page 1 of 1 |
| APPLICATION NO. | : 11/550096 | |
| DATED | : October 27, 2009 | |
| INVENTOR(S) | : Katsushi Otsuka | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 307 days.

Signed and Sealed this

Twelfth Day of October, 2010

David J. Kappos
*Director of the United States Patent and Trademark Office*